(12) United States Patent
Pietrantoni et al.

(10) Patent No.: US 7,547,007 B1
(45) Date of Patent: Jun. 16, 2009

(54) WELDING CLAMP

(75) Inventors: Renato L. Pietrantoni, Rochester, NY (US); Wayne W. Slack, Fairport, NY (US); David R. Nazzaro, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/001,386

(22) Filed: Dec. 11, 2007

(51) Int. Cl.
B25B 11/00 (2006.01)
(52) U.S. Cl. .............................................. 269/8; 269/6
(58) Field of Classification Search ................... 269/37, 269/6, 3, 8, 95
See application file for complete search history.

(56) References Cited

U.S. PATENT DOCUMENTS

| | | | | |
|---|---|---|---|---|
| 1,371,073 A | * | 3/1921 | Crandall | 269/246 |
| 3,218,058 A | * | 11/1965 | Smith | 269/166 |
| 3,575,304 A | * | 4/1971 | Hurst et al. | 414/787 |
| 4,316,605 A | * | 2/1982 | Zachry et al. | 269/43 |
| 5,052,092 A | * | 10/1991 | Vallauri et al. | 29/234 |
| 5,088,682 A | * | 2/1992 | Gibbs | 248/542 |
| 5,270,678 A | * | 12/1993 | Gambut et al. | 335/289 |
| 5,377,456 A | * | 1/1995 | Dixon | 451/364 |
| 6,092,271 A | * | 7/2000 | Stojkovic et al. | 29/281.5 |
| 6,361,034 B1 | * | 3/2002 | Wolfe | 269/8 |
| 7,210,676 B1 | * | 5/2007 | Blau | 269/37 |

* cited by examiner

Primary Examiner—Lee D Wilson
(74) Attorney, Agent, or Firm—James J. Ralabate

(57) ABSTRACT

A clamp for use in welding which has a unshaped configuration with a base section having two movable jaws connected to it. The jaws are spring loaded so they will widen to fit objects to be welded at least one of the jaws has cut out portions to permit the user to see the location to be welded. The jaws at their lead edges are chamfered for easy installation. A magnet is located in the base section to aid in the securing of the clamp.

8 Claims, 8 Drawing Sheets

WELDING CLAMP

This invention relates to a clamp for use in a welding operation, and more specifically to a self adjusting clamp with cut out areas for welding access.

BACKGROUND

There are known various apparatus for aligning proximal edges of two or more metallic materials to be connected by welding along their proximal edges. In a wide variety of manufacturing and metal processing applications, it is often desirable or necessary to join together tubes, bars, sheets or strips of metals such as aluminum or steel or their alloys by welding along a contiguous edge. Such joining can be accomplished by conventional welding equipment such as used in butt, or arc welding using electron beam, high energy lasers, plasma or other welding devices.

The quality of the seam-welding joined sheets is influenced to a great extent by the type of equipment used in the welding operations including the edge alignment devices, and clamps used to hold the joined sheets together. It should be noted that the sheets (or bars, or tubes, etc.) to be joined need not be made of identical materials, and often are not.

When preparing a frame or other item for welding, rigid steel plates are required to correctly align and position the pieces to be welded together. These When preparing a frame or other item for welding, rigid steel plates are required to correctly align and position the pieces to be welded together. These plates must then be clamped by hand, one by one. This requires several clamps for each locating plate. A typical prior art clamp and alignment comprises clamps of conventional locking pliers having opposing jaw member to apply a clamping force on an alignment plate that fits over of this area to be welded. These clamping pliers usually have adjusting means at their lower portion to adjust the force or clamping action needed on the alignment plate.

Thus, in some prior art devices an alignment plate is needed to align the two items or members to be welded, and two plier-like clamps need to fit into these alignment plates. Set up and disassembly of all these required items are time consuming, awkward and, in addition, inefficient and difficult to use.

Welding a metallic frame or members requires that each frame member be held in a critical alignment position to ensure a precise and accurate weld. In the past, frame members were held in place by a multitude of these prior art pliers-like/welding clamps. These clamps required forceful gripping and awkward posturing for application and releasing of the clamps. The tedious repetitiveness of clamping would become apparent toward the end of the shift as operator fatigue would often set in. The present invention provides a set of individual clamping fixtures that easily slide into position and maintain the critical alignment positioning of the frame members. The simple, yet effective, configuration of this invention in use replaced 12 of 36 prior art clamps, and helped to minimize any opportunity for repetitive motion injury.

SUMMARY

This invention provides an alternative method (to standard clamping) of securing frame or other components in place for welding. In the manufacturing of metal frame components the normal method to hold one frame component in place to another for welding would be with conventional welding clamps. As noted above, the operator must locate, hold, and clamp the components accurately in position for the components to be correctly welded. This process can often be cumbersome and hazardous when performed repetitively by a single operator. The frame or other components to be welded together are large and heavy and can challenge the operator's ability to accurately position the piece to each other. The nature of the components also poses a safety issue as the components can often slip or move during the process thus falling and causing personal injury. The frame components, when correctly fabricated, have fastening holes/features machines into them that are later used to mount and secure the machines subsystems. Improper alignment of these frame components during the welding process causes rework or scrap due to subsystems failing to mate correctly to one-another. This invention has eliminated the requirement for the operator to hand fasten multiple prior art clamps in order to hold the frame or other member components together. Additionally, this configuration improves the operators' ability to position the members or frame sections safely, quickly, and correctly in place, thus saving time and reducing scrap and risk of injury.

A thrust of this invention is a single clamping tool that is spring loaded and has components that align and hold frame segments in place for welding. Further, this configuration can incorporate a device with a magnet to assist in clamping, and aligning pieces for fabrication and welding. The clamp of this invention automatically centers the members to be welded eliminating the need for prior art aligning plates and two or more pliers-like grippers.

Embodiments of this invention provides a device with spring-loaded welding clamps that are easier and safer to use and provide more accurate placement than standard welding clamps. The configuration features spring-loaded parallel clamping faces or jaws with cutouts for welding viewing and access and with magnets to help secure the clamps in place. There are several sizes and shapes, each tailored for one or more specific welding locations on the frame. The three main parts (2 jaws and the base plate) for each clamp could be mix-and-matched to provide various sizes. As noted above, magnets could be used in the base plates to better secure the clamp to the items to be welded together.

Embodiments of the welding clamp of this invention comprises an inverted u-shaped configuration with a handle, two parallel jaws and a base plate. The two jaws are attached to the base plate by at least two to four spring loaded stripper bolts. The jaws have a space therebetween to make room for the items to be welded to fit into. These items will force the jaws apart in a tightening manner, and together with a base late magnet, will firmly hold the clamp in position. This clamp avoids the necessity of an alignment plate of the prior art and is self-alignment and self-adjusting when located adjacent the place to be welded. The alignment of the frame components or members is accomplished by the clamping mechanism itself. A handle in the base plate helps position and align the clamp and jaws keep the clamp firmly in position.

The holding power and centering ability of the present clamp is due to the four equal force springs (of the stripper bolts) and their ability to apply equal pressure from both jaws of the clamp. A cutout portion(s) or window in the jaws in the clamp allows the welding operator to tack weld the members in place. In one embodiment only one of the two jaws has a cut out portion; in a second embodiment both jaws have cut out portions. Once the members are tack welded together, the clamp can be removed if later full size welds are needed.

In the jaws of the clamp, at least one jaw has a cutout section that provides viewing and access to the joint to be welded. A magnet in an embodiment is located in the inside portion of the base plate. As above noted, the configuration of the welding clamp of this invention eliminates the need for multiple locators or steel plates, and multiple plier like clamps. It reduces the risk of operator discomfort due to multiple clamping activities on a daily basis. It also provides a fast, accurate and safe system for locating and holding frame components (or members to be welded together) in place for welding. There is provided by this invention a savings in cost and time in addition to improved safety.

DETAILED DISCUSSION OF DRAWINGS AND PREFERRED EMBODIMENTS

Figure 1:
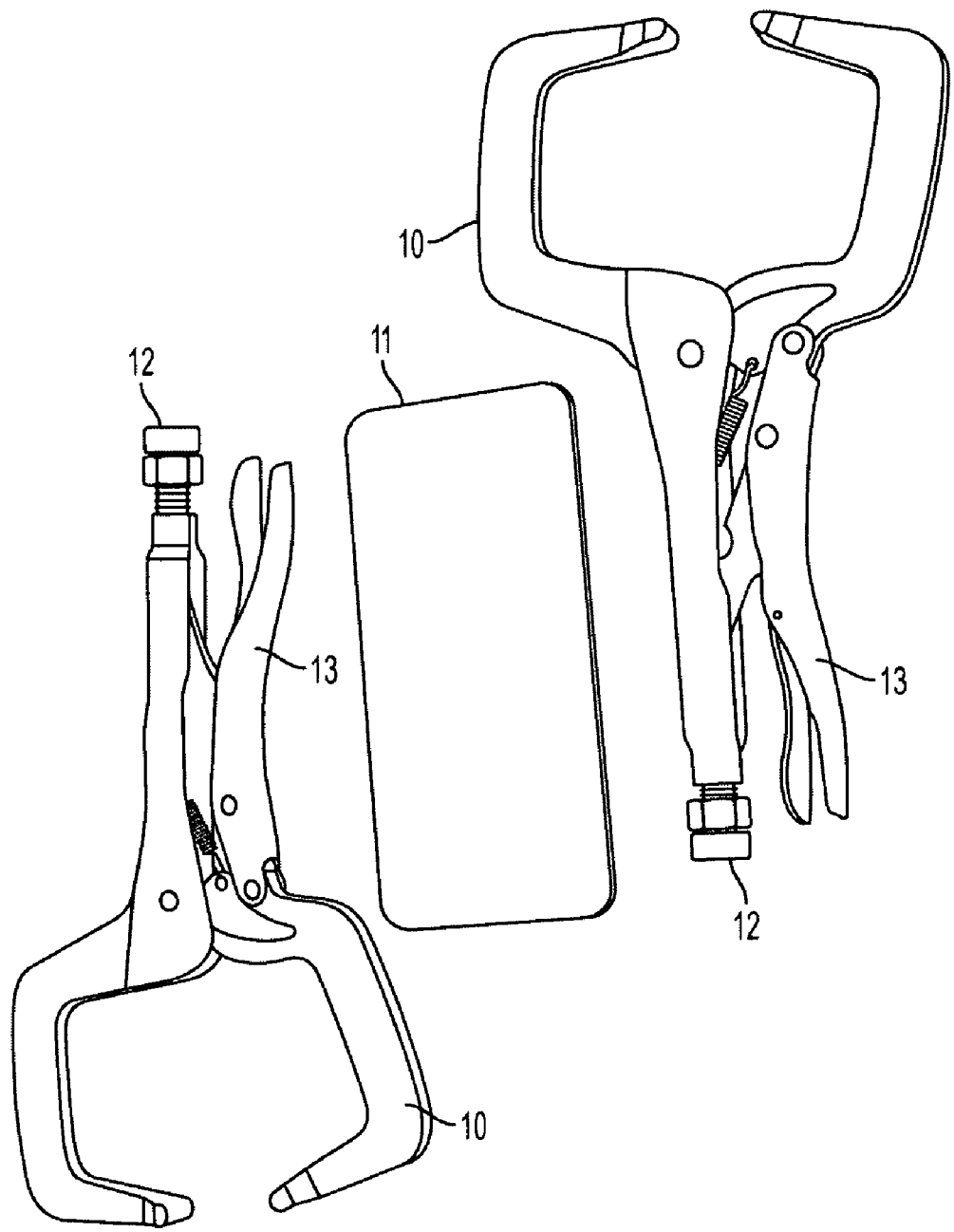
FIG. 1 illustrates prior art items used in some welding operations to clamp components in place before welding them together.

In FIG. 1 the components of a prior art welding clamp assembly are illustrated. This prior art assembly consists of two pliers-like clamps 10 and a steel alignment plate 11. The clamps 10 are adjusted by manipulation of the screw adjusting means 12, and are fixed in place by clamp handle 13.

Figure 2:
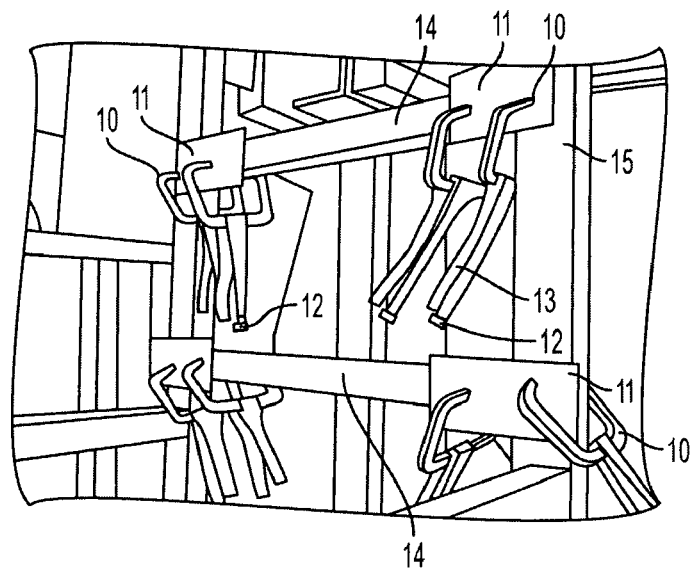
FIG. 2 illustrates how the prior art items of FIG. 1 are used to align and prepare for welding.

In FIG. 2 the positioning of these prior art FIG. 1 assemblies are shown in place prior to welding pieces 14 and 15 together. Note that two prior art clamps 10 are required to hold alignment steel plates 11 in place at each welding location. The weld is generally applied on an opposite side to the plate 11 location. These steel plates 11 must be clamped by hand one by one and adjusted to then suit each clamping location. Without proper alignment and clamping, these alignment plates 11 may slip and adversely affect the welding process.

Figure 3:
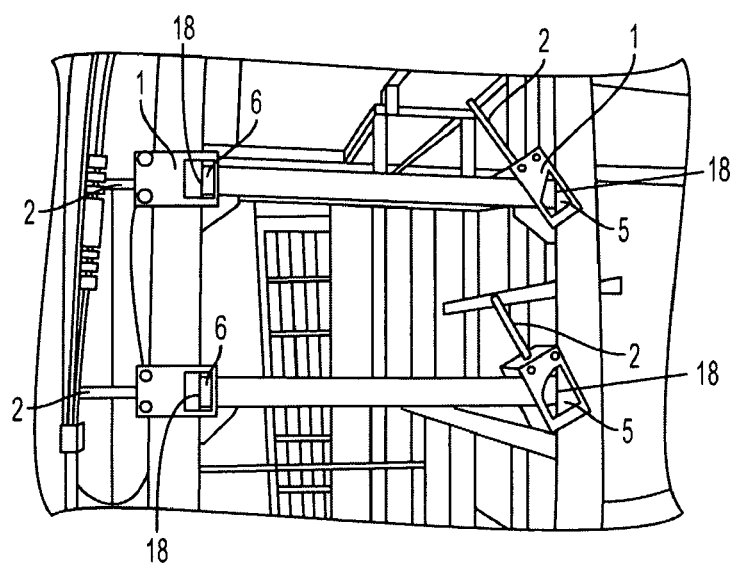
FIG. 3 illustrates two embodiment of the clamps of the present invention as they are positioned and aligned in place before the welding operation.

In contrast, FIG. 3 illustrates the placement of the inverted u-shaped clamps 1 of this invention, each having a placement handle 2, two jaws 3 and a base section 4. These clamps 1 may be positioned by the handle 2 at any proper angle at the location where the weld will take place. The cutout portion 5 of the jaws easily exposes the joining or welding location. These cutout portions may be modified triangular cutouts 5, elongated cutouts 6 or any other suitable cutout design. Note that only one clamp 1 is needed in the present invention as compared to two clamps 10 and a metal alignment plate 11 of the prior art. The clamp 1 of the present invention merely needs to be pushed in place by handle 2 and the jaws 3 will self adjust to fit and securely spring lock in place adjacent the area to be welded. Chamfered edges 16 are provided in each lead edge of jaws 3 for easy positioning around members to be welded.

Figures 4A, 4B:
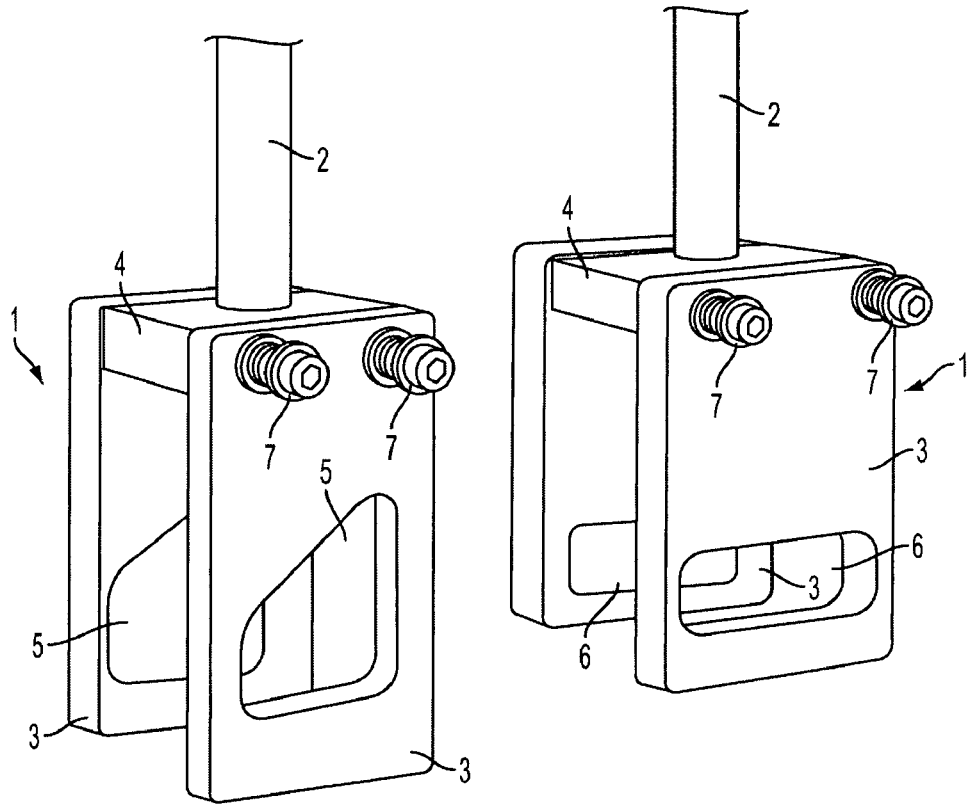
FIGS. 4A and 4B illustrate two embodiments each with two cutout portions one in each of the jaws.

FIGS. 4A and 4B show two embodiments of the clamp 1 of this invention; 4B is a jaw clamp with an elongated cutout 6 and FIG. 4A is a clamp jaw with a modified triangular cut out. These cutouts 5 and 6 are in this embodiment on both jaws 3 of clamp 1, so that easy viewing of the place of welding for the user is provided. The jaws 3 of the clamp 1 are spring loaded and connected to the base section 4 by spring loaded stripper bolts 7. Although these front-side view of FIGS. 4A and 4B show only two bolts 7, actually four bolts 7 are used; two on each side. Each jaw 3, therefore, is spring loaded connected to base section 4 by four bolts. As the clamp 1 is pushed into or adjusted to the site to be welded, the jaws are forced apart by forcing onto the welding site. The strong spring action of the bolts 7 and a magnet 8 inside the base section 4 (see FIG. 8) securely hold the clamp 1 in place.

Figure 5:
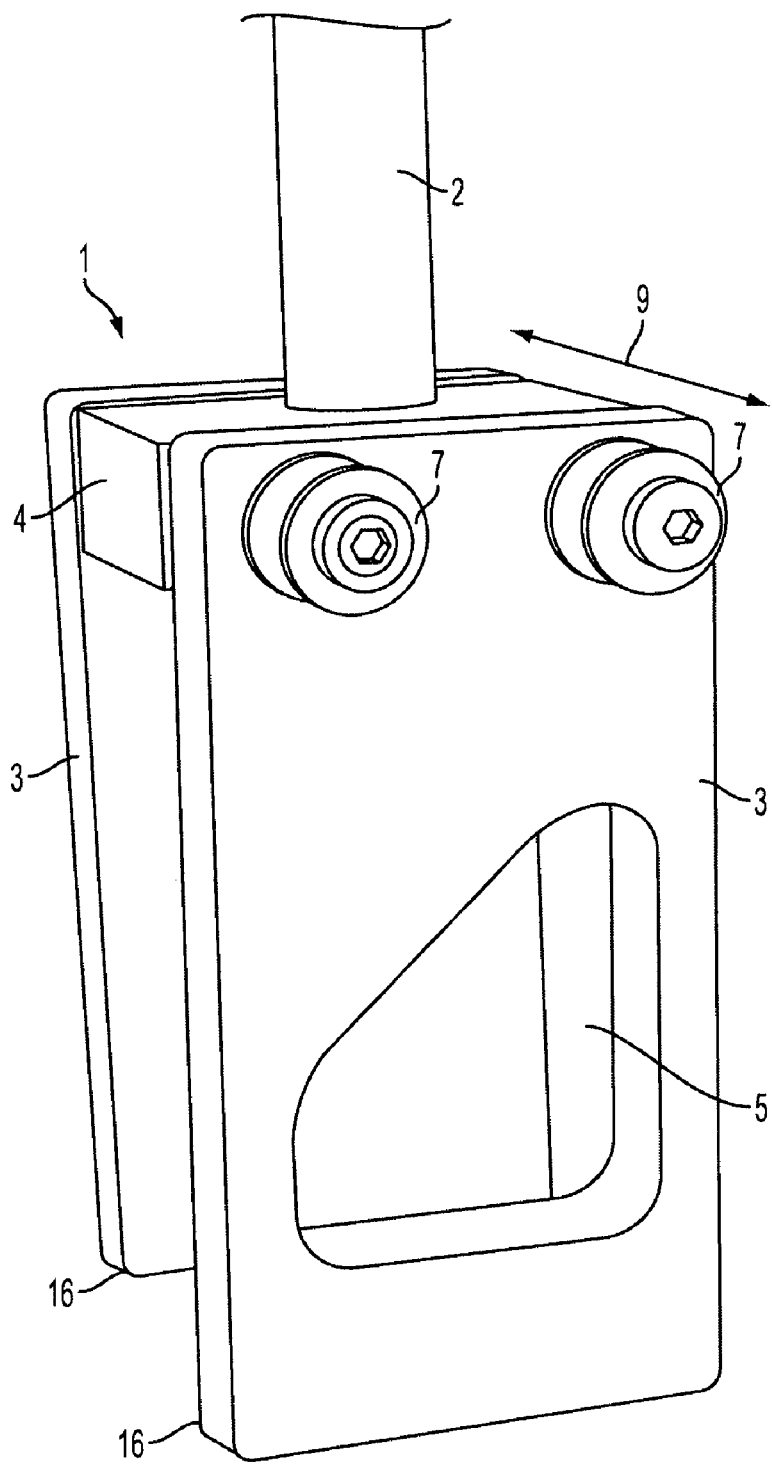
FIG. 5 illustrates an embodiment of this invention where there is only one modified triangular cutout in one of the spring loaded jaws.

In FIG. 5 an embodiment of clamp 1 is shown with a modified triangular cutout 5 on only one jaw 3 and not on both. The arrows 9 show the directions the jaws 3 will move outwardly when force-pressed onto the site of the welding. This jaw movement occurs in all embodiments of FIGS. 4-8. The clamp 1 and components may be made from any suitable material such as aluminum, steel, any suitable metal or compositions that are rigid and non-flammable. Jaws 3 at their open ends or lead edges are chamfered at edges 16 for easy sliding onto the welding site.

Figure 6:
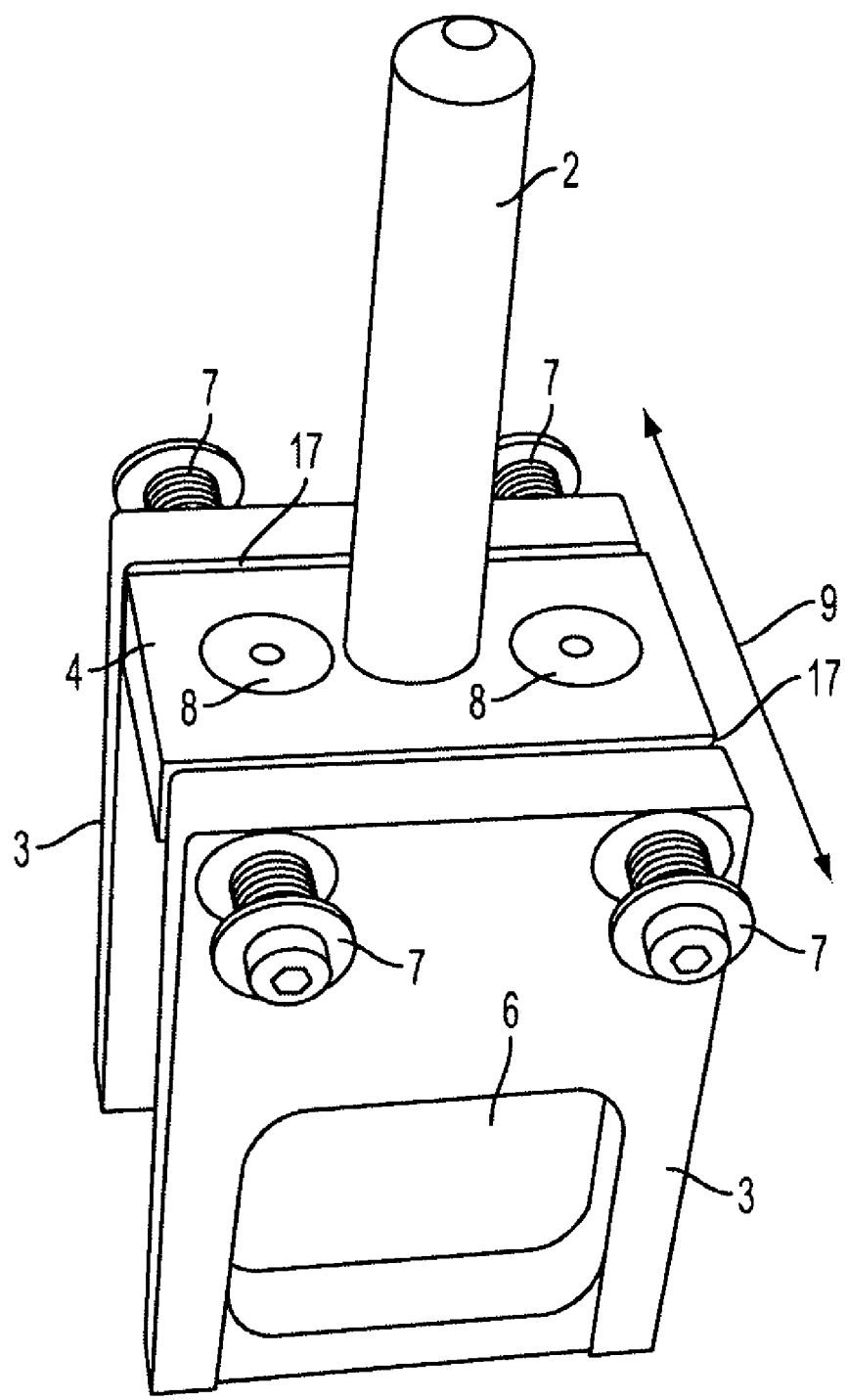
FIG. 6 illustrates an embodiment of this invention where there is only one modified elongated cutout in one of the spring loaded jaws.

In FIG. 6 an embodiment of clamp 1 of this invention is shown with an elongated rectangular cutout portion 6 on only one jaw 3. The arrow 9 shows the outward directions spring loader jaws 3 will move when forced over the numbers 14 and 15 to be welded together as in FIG. 3. A space 17 is shown between the jaw 3 and base section 4; this space 17 will approximate the thickness of the members to be welded together. The cutout 6 will make viewing and access of the site to be welded possible.

Different suitable cutout shapes can be used, if desirable. For example, one jaw 3 can have an elongated rectangular cutout and the opposite jaw 3 can have a modified triangular cutout or any other shape cutout.

Figure 7:
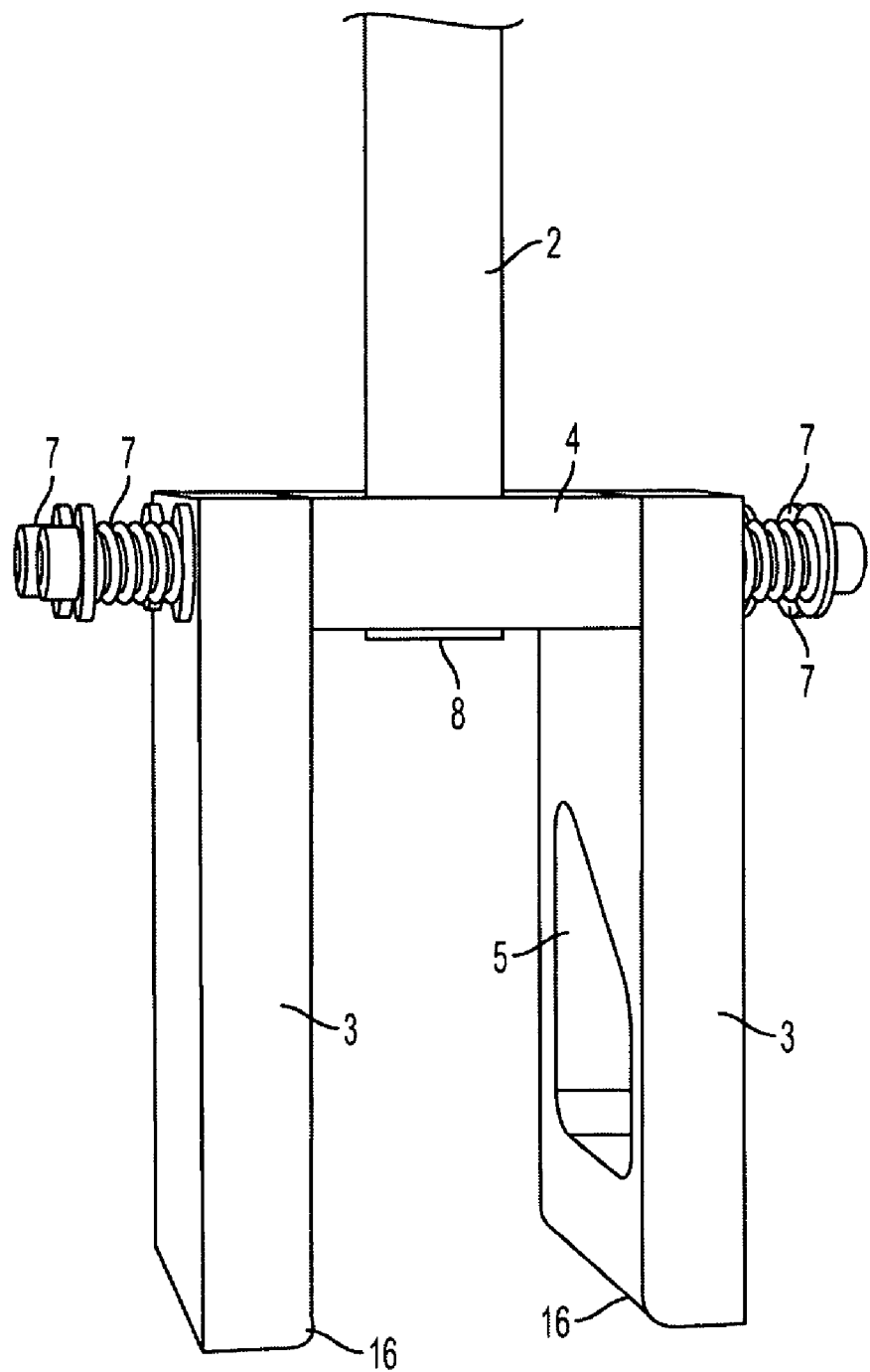
FIG. 7 illustrates an embodiment of this invention emphasizing the chamfered edged of the lead edge of the jaws for easy positioning.

In FIG. 7 a front view of clamp 1 is shown with emphasis on showing the chamfered inner or lead edges 16 of the jaws 3 for easy sliding into position when used. All of the clamp embodiments of the invention shown in FIGS. 4-8 have these chamfered edges 16. The location of magnet(s) 8 in the inner section of base portion 4 is also shown. This embodiment has only one cutout portion 5 on only one jaw 3. This cutout portion in this embodiment is a modified triangular cutout 6.

Figure 8:
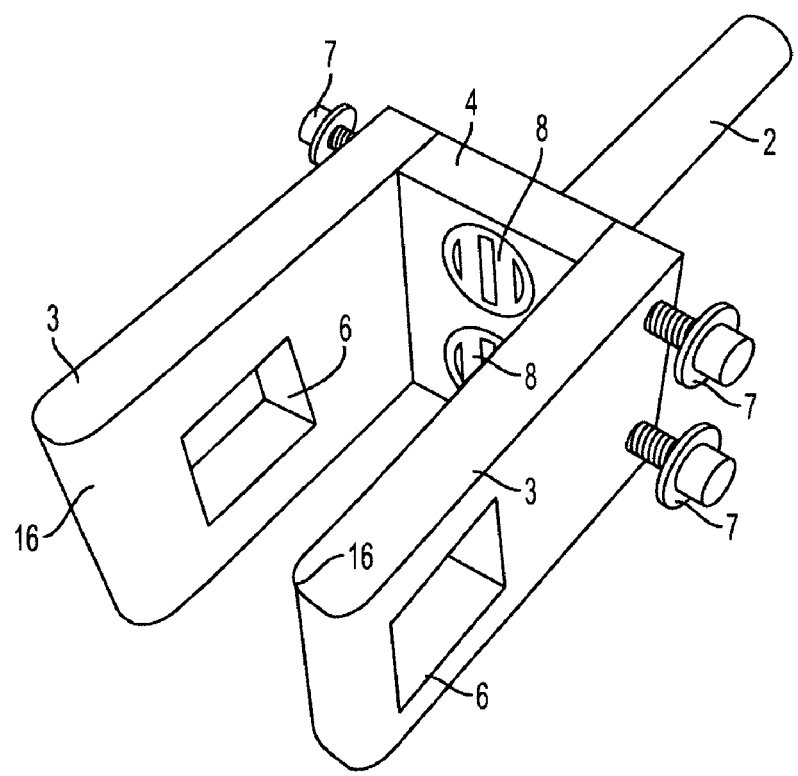
FIG. 8 illustrates a perspective top view of an embodiment showing the locations of the magnets in the roof of the base piece.

In FIG. 8 a top perspective view of clamp 1 of this invention is illustrated to show the location of magnets 8 in the inside of base section 4. These magnets 8 and clamp jaws or clamp provides secure fixing of clamp 1 in position when placed against the numbers 14 and 15 to be welded. This embodiment also has two cut-out portions 6 for easy viewing of the site to be welded.

Figure 9:
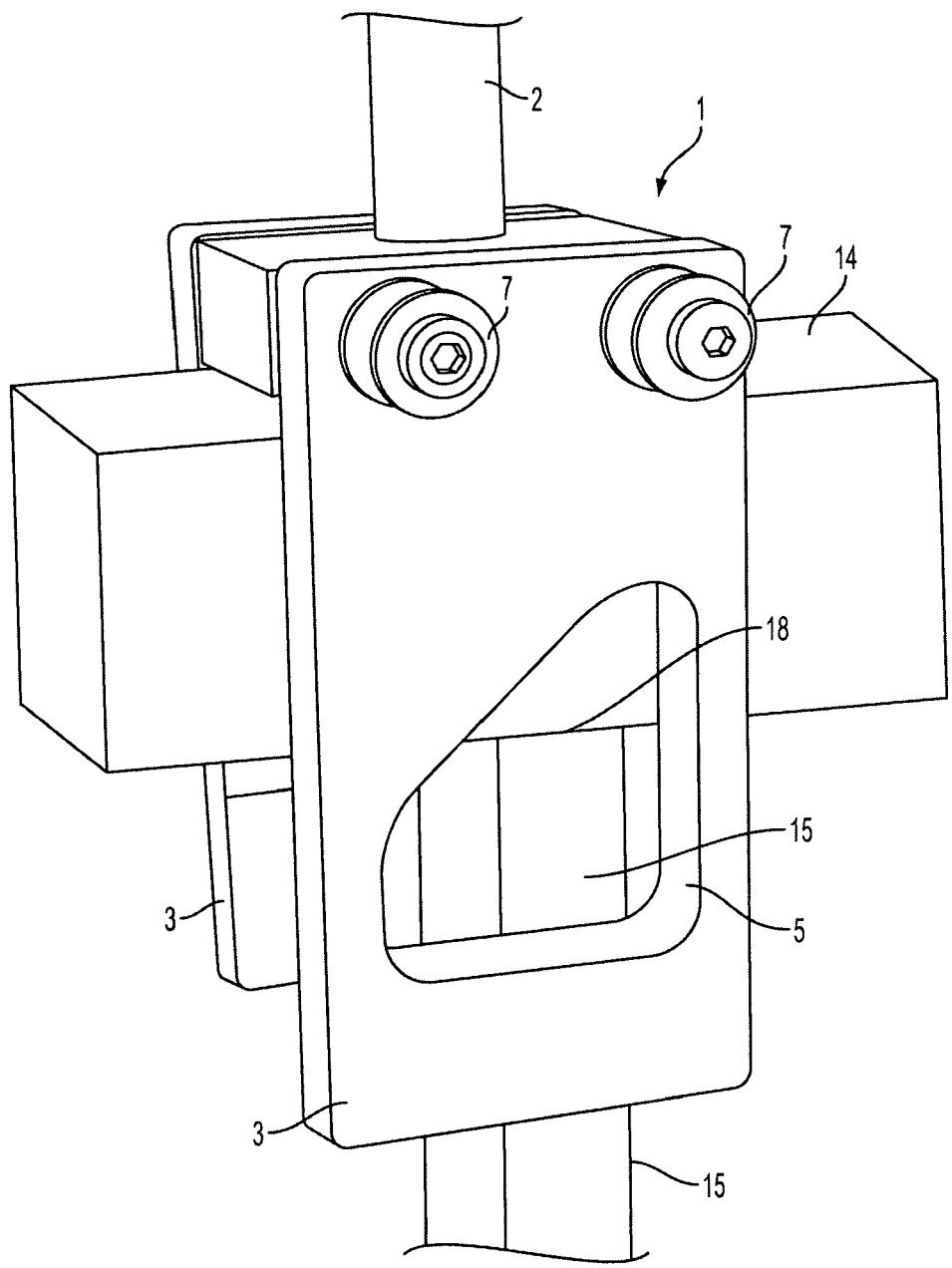
FIG. 9 illustrates a clamp embodiment showing the location of the site to be welded to connect two members.

FIG. 9 shows clamp 1 when positioned to hold pieces 14 and 15 together before the welding operation. The jaws 3 of the clamp 1 are tightly fit over members or pieces 14 and 15 so that they are perfectly aligned prior to joining (by welding) members 14 and 15 at a welding location 18. Jaws 3 are tightly enclosing members 14 and 15 to hold and align them before welding them together at joint 18. Note that cutout 5 permits easy viewing and access to joint 18.

In summary, the present invention provides a u-shaped clamp useful in welding operations. The clamp comprises: a clamp base section, at least one magnet, two clamp jaws, spring loaded stripper bolts and a clamp handle. The jaws are movably connected to the base section by the spring loaded stripper bolts. The handle is connected to an upper portion of the base section and is enabled to assist in placing the clamp adjacent to a site to be welded and the at least one magnet is located in the base section. A cutout portion is located in at least one of the jaws. The cutout portion is enabled to permit a user to view a site to be welded. There can, in one embodiment, be two cutout portions in each jaw, if required.

The jaws have terminal leading edges which are chamfered to facilitate easy position of the jaws around members or tubes to be welded. At least two of the spring loaded stripper bolts connect each jaw to the base section. At least one magnet is positioned in the base section at a location in the base section between the jaws.

The cutout portion or portions are located in at least one of the jaws. This cutout portion is enabled to be positioned adjacent to a site to be welded and is enabled to permit a window for easy viewing of the site to be welded.

As noted, this unshaped or horseshoe shaped clamp is useful in welding operations. The clamp comprises as above noted: a clamp base section, at least one magnet, two clamp jaws, four spring loaded stripper bolts and a clamp handle.

The jaws are movably connected by the bolts to the clamp base section. Two (of the four bolts) are positioned through an upper section of each of the jaws thereby movably connecting each jaw to the base section.

The jaws have an upper section which movably connects to the base section and a lower section which are lead terminal jaw portions that are chamfered for easy positioning around members or tubes to be welded.

The spring loaded bolts are enabled to exert a sufficient pressure upon the tubes or members to hold the clamp securely in place once positioned around the members.

The cutout portion is located in at least one of the jaws (or two jaws if preferred). The cutout portion is enabled to permit a user to view a site to be welded. The at least one magnet is positioned in the base section at a location between the jaws. The jaws and the base section of the clamp are constructed of a rigid metal such as aluminum or steel.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A u-shaped clamp comprising:
   a clamp base section,
   two side-by-side positioned clamp jaws having an upper section and a lower section,
   at least one magnet and,
   four spring loaded stripper bolts, said jaws having upper sections movably connected by said stripper bolts to said clamp base section, two of said four bolts positioned through said upper section of each of said jaws, thereby movably connecting each said jaw to said base section in parallel spacing,
   said jaws having in said lower section, lead jaw portions that are chamfered for easy positioning around members to be welded,
   said magnet positioned at a location in said base section, between said jaws, at least one of said jaws having cutout portions configured to be positioned adjacent to and configured to permit access and viewing of a place of welding.

2. The clamp of claim 1 wherein said cutout portions are configured to permit a window for full and easy viewing in addition to access of said site to be welded.

3. The clamp of claim 1 wherein two of said spring loaded stripper bolts each connecting said jaws to said base section, are configured to permit self alignment of said jaws around a site to be welded and configured to apply substantially equal pressure from both sides of said base section.

4. The clamp of claim 1 wherein a cutout portion is located in at least one of said jaws, said cutout portion enabled to be positioned adjacent a site to be welded, and enabled to permit a window for easy access and viewing of said site to be welded.

5. The clamp of claim 1 wherein said jaws are configured to be free to move outwardly along said stripper bolts, and wherein a sufficient holding power of said clamp is provided by said four equal force spring loaded bolts.

6. The clamp of claim 1 wherein a clamp handle is connected to said base section and enables said jaws into proper position prior to welding.

7. The clamp of claim 1 wherein said cutout portions are of a configuration selected from the group consisting of a modified triangular cutout, a modified rectangular cutout and mixtures thereof.

8. The clamp of claim 1 wherein only one of said jaws have a cutout portion.

* * * * *